United States Patent
Maruyama et al.

(10) Patent No.: US 8,292,359 B2
(45) Date of Patent: Oct. 23, 2012

(54) ROOF APPARATUS FOR VEHICLE

(75) Inventors: Jun Maruyama, Nagoya (JP); Youji Nagashima, Kariya (JP); Noboru Iwanaga, Miyoshi (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/137,112

(22) Filed: Jul. 21, 2011

(65) Prior Publication Data

US 2012/0112496 A1    May 10, 2012

(30) Foreign Application Priority Data

Nov. 5, 2010   (JP) ................................. 2010-248133

(51) Int. Cl.
*B60J 7/00* (2006.01)
*B60J 7/057* (2006.01)

(52) U.S. Cl. .................. 296/216.08; 296/223
(58) Field of Classification Search ...... 296/216.01–224
See application file for complete search history.

(56) References Cited

U.S. PATENT DOCUMENTS

| | | | | |
|---|---|---|---|---|
| 5,026,113 | A * | 6/1991 | DiCarlo et al. ............... | 296/221 |
| 5,104,178 | A * | 4/1992 | Bienert .................... | 296/216.08 |
| 5,527,086 | A | 6/1996 | Mori et al. | |
| 6,431,644 | B1 | 8/2002 | Nagashima et al. | |
| 6,588,834 | B2 | 7/2003 | Maeta et al. | |
| 6,644,728 | B1 * | 11/2003 | Nagashima et al. .......... | 296/213 |
| 6,786,540 | B2 * | 9/2004 | Friedrich et al. ............. | 296/223 |
| 7,934,768 | B2 * | 5/2011 | Sawada ....................... | 296/223 |
| 2012/0032476 | A1 * | 2/2012 | Hirata et al. ............. | 296/216.04 |

FOREIGN PATENT DOCUMENTS

| | | |
|---|---|---|
| JP | 7-149153 | 6/1995 |
| JP | 3659632 | 3/2005 |

* cited by examiner

*Primary Examiner* — Dennis Pedder
(74) *Attorney, Agent, or Firm* — Finnegan, Henderson, Farabow, Garrett & Dunner, LLP

(57) ABSTRACT

A roof apparatus for a vehicle, includes a pair of guide rails, a movable panel, a housing, a casing, and a first spur tooth rack belt and a second spur tooth rack belt for transmitting a drive force of a drive mechanism to the movable panel. The first spur tooth rack belt includes plural first spur teeth and the second spur tooth rack belt includes plural second spur teeth, and a slope portion inclined upward toward a rear side of the vehicle is provided forward of each of the pair of guide rails. A pair of guide portions is provided at each of the guide rails for guiding the first spur tooth rack belt and the second spur tooth rack belt. A cutout portion is formed at a front end portion of each of the guide rails.

9 Claims, 11 Drawing Sheets

ROOF APPARATUS FOR VEHICLE

CROSS REFERENCE TO RELATED APPLICATIONS

This application is based on and claims priority under 35 U.S.C. §119 to Japanese Patent Application 2010-248133, filed on Nov. 5, 2010, the entire content of which is incorporated herein by reference.

TECHNICAL FIELD

This disclosure generally relates to a roof apparatus for a vehicle.

BACKGROUND DISCUSSION

A known roof apparatus for a vehicle includes a pair of left side and right side guide rails, a movable panel, a housing and a pair of drive force transmitting members. The pair of guide rails extends along a front/rear direction of a vehicle along both side portions of an opening portion formed on a roof of the vehicle. The movable panel for opening and closing the opening portion is supported by the pair of guide rails so as to be slidable in the front/rear direction of the vehicle. The housing extends in the width direction of the vehicle along a front portion of the opening portion and is connected to a front end surface of each of the pair of guide rails. A drive mechanism and a casing are provided at the housing. The drive force transmitting member is inserted into the casing. The drive force transmitting member is guided by and slides along the casing and the pair of guide rails, and thus moves the sliding panel in the front/rear direction of the vehicle for opening and closing the opening.

For example, a sunroof device for use in a vehicle in which drive cables are used as the drive force transmitting member is disclosed in JPH7-149153A (hereinafter referred to as Patent reference 1). The sunroof device for use of the vehicle according to the Patent reference 1 is constituted by the housing, and a guide plate which is fixedly attached to a lower face of the housing and into which the drive cables are inserted.

In a sliding roof device disclosed in JP3659632B (hereinafter referred to as Patent reference 2), spur tooth rack belts are used instead of the above-stated drive cables as the drive force transmitting member. Each of the spur tooth rack belts includes spur teeth protruding in a direction perpendicular to a longitudinal direction of the spur tooth rack belt in a manner that the surfaces, on which the spur teeth are formed, of the spur tooth rack belts face each other.

However, in case that the spur tooth rack belts disclosed in the Patent reference 2 are used as the drive force transmitting member of the sunroof device for use in the vehicle disclosed in the Patent reference 1, a tooth contact noise that will be explained may occur.

Generally, in the roof apparatus for the vehicle in which the drive cables are used as the drive force transmitting member, a front end surface of each of the guide rails, against which the casing is abutted in order to connect the casing to each of the guide rails, is formed so as to be perpendicular to passages formed at the guide rails for having the driving cables inserted therein.

In the roof apparatus for the vehicle in which the spur tooth rack belts are used as the drive force transmitting member, in case that the front end surface of each of the guide rails, to which the casing is connected, is formed so as to be perpendicular to the passages of the spur tooth rack belts, the front end surface is positioned parallel to each of the spur teeth of the spur tooth rack belts, that is, parallel to the direction in which each of the spur teeth protrudes.

Consequently, in case that the casing is connected to each of the guide rails in an offset manner even slightly in the width direction of the vehicle, and thus a step is formed between an inner wall surface (a surface on which the spur teeth slide) of the casing and an inner wall surface (a surface on which the spur teeth slide) of the each of the guide rails, each of the spur teeth may come into contact with more than one edge portions of the front end surface of each of the guide rails at a time when passing through the connecting portion between the casing and each of the guide rails in order to move from the casing to the guide rails. This may cause a noise (the tooth contact noise).

A need thus exists for a roof apparatus for a vehicle, which is not susceptible to the drawback mentioned above.

SUMMARY

According to an aspect of this disclosure, a roof apparatus for a vehicle includes a pair of guide rails extending in a front/rear direction of the vehicle along side end portions of an opening portion formed on a roof of a vehicle, a movable panel supported by the pair of guide rails and opening and closing the opening portion by moving in the front/rear direction of the vehicle, a housing extending in a width direction of the vehicle along a front end portion of the opening portion, being connected to a front end portion of each of the pair of guide rails and supporting a drive mechanism, a casing at least part of which is constituted by the housing, a first spur tooth rack belt and a second spur tooth rack belt both of which are accommodated in the pair of guide rails and in the casing in a manner that the first spur tooth rack belt and the second spur tooth rack belt slide along the pair of guide rails and along the casing for transmitting a drive force of the drive mechanism to the movable panel. The first spur tooth rack belt includes a plurality of first spur teeth formed on a surface of the first spur tooth rack belt which faces a surface of the second spur tooth rack belt on which a plurality of second spur teeth are formed in a manner that the plurality of first spur teeth and the plurality of second spur teeth protrude in a direction perpendicular to a lengthwise direction of the first spur tooth rack belt and the second spur tooth rack belt, a slope portion constituting part of the casing and being inclined upward toward a rear side of the vehicle is provided forward of each of the pair of guide rails relative to the front/rear direction of the vehicle, a pair of guide portions is provided at each of the guide rails, the guide portions positioned keeping a distance from each other in the width direction of the vehicle for guiding the first spur tooth rack belt and the second spur tooth rack belt respectively in the front/rear direction of the vehicle, each of the pair of guide portions includes a bottom wall portion and a pair of restricting wall positioned at side portions of the bottom wall portion relative to the width direction of the vehicle, and a front end portion of each of the pair of guide rails includes a cutout portion formed by cutting out the bottom wall portion, and the slope portion and each of the pair of guide portions are connected with each other in a manner that the slope portion communicates with each of the pair of guide portions via the cutout portion.

According to another aspect of this disclosure, a roof apparatus for a vehicle includes a pair of guide rails extending in a front/rear direction of the vehicle along side end portions of an opening portion formed on a roof of a vehicle, a movable panel supported by the pair of guide rails and opening and closing the opening portion by moving in the front/rear direction of the vehicle, a housing extending in a width direction of the vehicle along a front end portion of the opening portion, being connected to a front end portion of each of the pair of guide rails and supporting a drive mechanism, a casing at least part of which is constituted by the housing, a first spur tooth rack belt and a second spur tooth rack belt both of which are accommodated in each of the pair of guide rails and in the casing in a manner that the first spur tooth rack belt and the second spur tooth rack belt slide along the pair of guide rails and along the casing for transmitting a drive force of the drive mechanism to the movable panel, the first spur tooth rack belt including a plurality of first spur teeth formed on a surface of the first spur tooth rack belt which faces a surface of the second spur tooth rack belt on which a plurality of second spur teeth are formed in a manner that the plurality of first spur teeth and the plurality of second spur teeth protrude in a direction perpendicular to a lengthwise direction of the first spur tooth rack belt and the second spur tooth rack belt, a slope portion provided forward of each of the pair of guide rails relative to the front/rear direction of the vehicle, the slope portion constituting part of the casing and being inclined upward toward a rear side of the vehicle, a pair of guide portions provided at each of the guide rails, the guide portions positioned keeping a distance from each other in the width direction of the vehicle for guiding the first spur tooth rack belt and the second spur tooth rack belt respectively in the front/rear direction of the vehicle, each of the pair of guide portions including a bottom wall portion and a pair of restricting wall portions positioned at side portions of each of the bottom wall portion in the width direction of the vehicle, a cutout portion formed at a front end portion of each of the pair of guide rails by cutting out the bottom wall portion, and a pair of partition walls formed at a slope configuring portion provided forward of the bottom wall portions of the pair of guide portions in the front/rear direction of the vehicle, each of the pair of partition walls being inclined upward toward the rear side of the vehicle. The slope portion and each of the pair of guide portions are connected with each other in a manner that the slope portion communicates with each of the pair of guide portions via the cutout portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A first embodiment of a roof apparatus 10 related to this disclosure will be explained with reference to FIGS. 1 to 13 of the attached drawing. In the explanation hereunder, a front/rear direction refers to a forward/rearward direction relative to a traveling direction of the vehicle on which the roof apparatus 10 is mounted. An upper/lower direction or a vertical direction refers to an upper/lower direction or a vertical direction of the vehicle. A right/left direction or a width direction refers to a right/left direction or a width direction of the vehicle when the vehicle is traveling forward.

Figure 1:
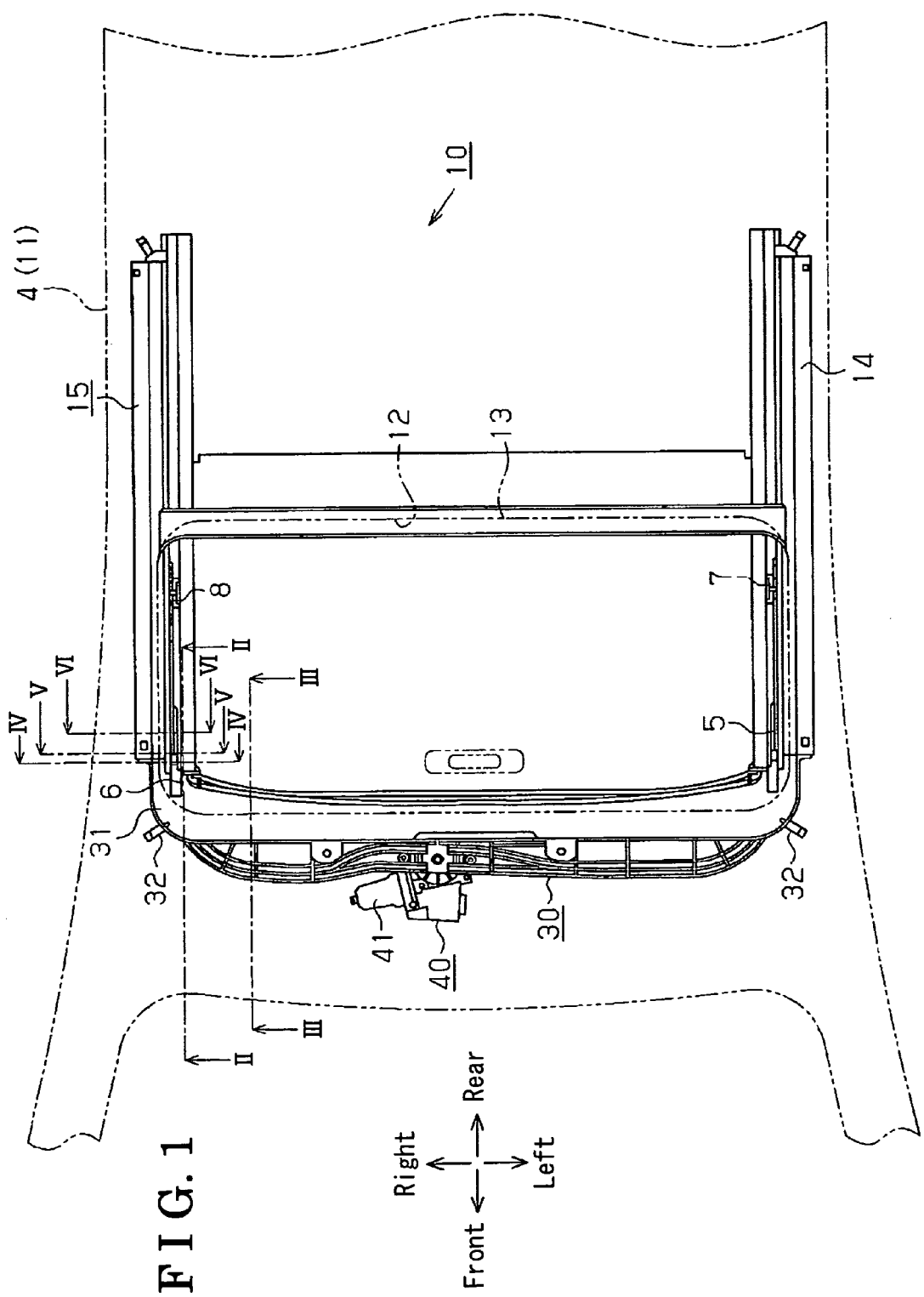
FIG. 1 is a schematic plan view of a roof apparatus for a vehicle according to a first embodiment disclosed here.
Figure 2:
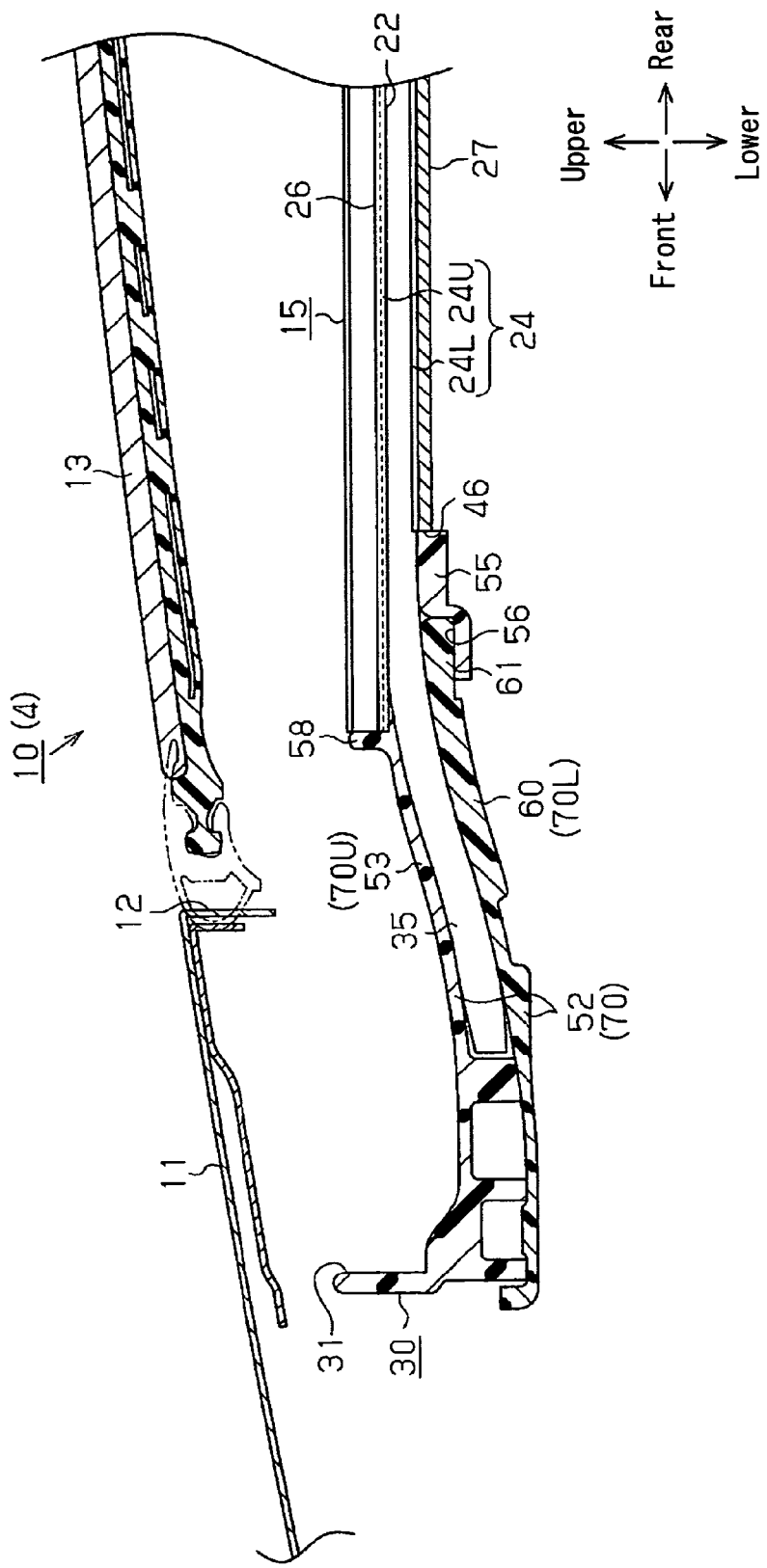
FIG. 2 is a cross-sectional view taken on line II-II of FIG. 1.
Figure 3:
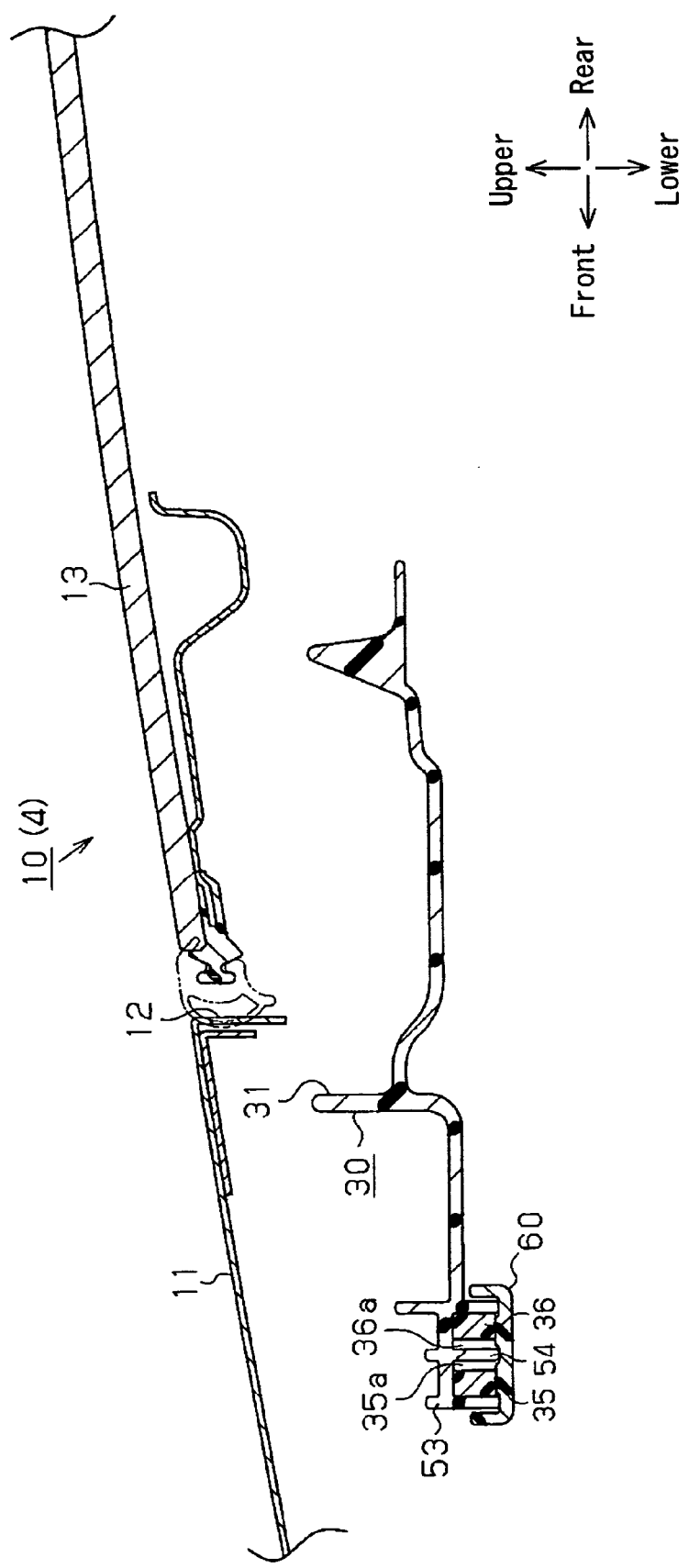
FIG. 3 is a cross-sectional view taken on line of FIG. 1.

As shown in at least one of FIGS. 1 and 2, the roof apparatus 10 for the vehicle opens and closes an opening portion 12 formed on a roof 11 of a vehicle 4 by means of a movable panel 13 in a similar manner used in a known sunroof apparatus.

A pair of guide rails 14, 15, that is, a left side guide rail 14 and a right side guide rail 15, is provided below left side and right side edge portions of the opening portion 12 respectively so as to extend in the front/rear direction of the vehicle along the left side and the right side edge portions of the opening portion 12. A front housing 30 (i.e., a housing) is provided below a front edge portion of the opening portion 12 so as to extend in the width direction of the vehicle along the front edge portion of the opening portion 12. The left side and the right side guide rails 14, 15 and the front housing 30 are fixedly attached to the roof 11.

Each of the guide rails 14, 15 includes a uniform cross section that is perpendicular to a longitudinal direction thereof (the front/rear direction of the vehicle). The cross sections of the guide rails 14, 15 are symmetrical to each other in the width direction of the vehicle. The guide rails 14, 15 are formed from an extruded light metal material including aluminum alloy but not limited thereto. Link members 5, 6 each supporting the movable panel 13 from below are attached to the guide rails 14, 15 respectively so that the link members 5, 6 slide in the front/rear direction of the vehicle and are inclined or tiled upward toward a rear side of the vehicle. Shoe members 7, 8 for sliding the link members 5, 6 in the front/rear direction of the vehicle while inclining the link member 5, 6 upward toward the rear side of the vehicle are attached to the guide rails 14, 15 respectively in a manner that the shoe members 7, 8 slide along the guide rails 14, 15 in the front/rear direction of the vehicle.

Next, a structure of the guide rails 14, 15 will be explained. The structure of the right side guide rail 15 will be explained and an explanation on the structure of the left side guide rail 14 will be omitted because the cross sections thereof are symmetrical to each other in the vertical direction of the vehicle as stated above.

Figure 6:
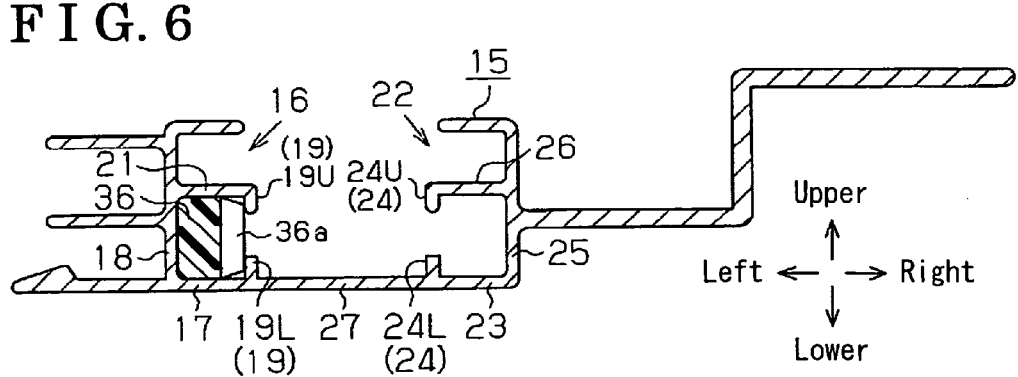
FIG. 6 is a cross-sectional view taken on line VI-VI of FIG. 1.

As shown in FIG. 6, a left side guide portion 16 guiding an inner spur tooth rack belt 36 (i.e., a second spur tooth rack belt), which will be explained below, in the front/rear direction of the vehicle is provided at a left side portion of an inside of the right side guide rail 15. The left side guide portion 16 includes a bottom wall portion 17, a pair of restricting wall portions 18, 19 formed at left side and right side portions of the bottom wall portion 17 respectively in the width direction of the vehicle so as to upwardly protrude in the vertical direction of the vehicle, and an upper wall portion 21 formed on upper end portions of the restricting wall portions 18, 19 so as to protrude in the width direction of the vehicle and so as to connect the restricting wall portions 18, 19 with each other.

A right side guide portion 22 guiding an outer spur tooth rack belt 35 (i.e., a first spur tooth rack belt), which will be explained below (refer to FIGS. 4 and 5), in the front/rear direction of the vehicle is provided at a right side portion of the inside of the right side guide rail 15. The right side guide portion 22 includes a bottom wall portion 23, a pair of restricting wall portions 24, 25 formed at left side and right side portions of the bottom wall portion 23 in the width direction of the vehicle so as to upwardly protrude in the vertical direction of the vehicle, and an upper wall portion 26 formed on upper end portions of the restricting wall portions 24, 25 so as to protrude in the width direction of the vehicle and so as to connect the restricting wall portions 24, 25 with each other.

A connecting bottom portion 27 is provided between the left side guide portions 16 and the right side guide portion 22 so as to connect the bottom wall portions 17 and 23. The connecting bottom portion 27, and the bottom portions 27 and 23 positioned at the left and right of the connecting bottom portion 27 respectively are coplanar to one another.

In the left side guide portion 16, the restricting wall portion 19, which is positioned closer to the connecting bottom wall portion 27 than the restricting wall portion 18 is positioned, is discontinued and separated in two at an intermediate portion thereof in the vertical direction of the vehicle. An upper portion and a lower portion of the restricting wall portion 19 will be identified as an upper restricting wall portion 19U and a lower restricting wall portion 19L respectively when necessary.

In the left side guide portion 22, the restricting wall portion 24, which is positioned closer to the connecting bottom wall portion 27 than the restricting wall portion 25 is positioned, is discontinued and separated in two at an intermediate portion thereof in the vertical direction of the vehicle. An upper portion and a lower portion of the restricting wall portion 24 will be identified as an upper restricting wall portion 24U and a lower restricting wall portion 24L respectively when necessary.

Because each of the restricting wall portions 19, 24, which are positioned closer to the connecting bottom wall portion 27 than the restricting wall portions 18, 25 are positioned, is separated into the two portions as explained above, a communication is established between the inside and an outside of each of the guide portions 16, 22. Thus, one of the outer spur tooth rack belt 35 and the inner spur tooth rack belt 36, which are accommodated inside the guide portion 16, 22 respectively, is connected to one of the shoe members 7 or 8, which are positioned outside the guide portions 16, 22 respectively.

Figure 7:
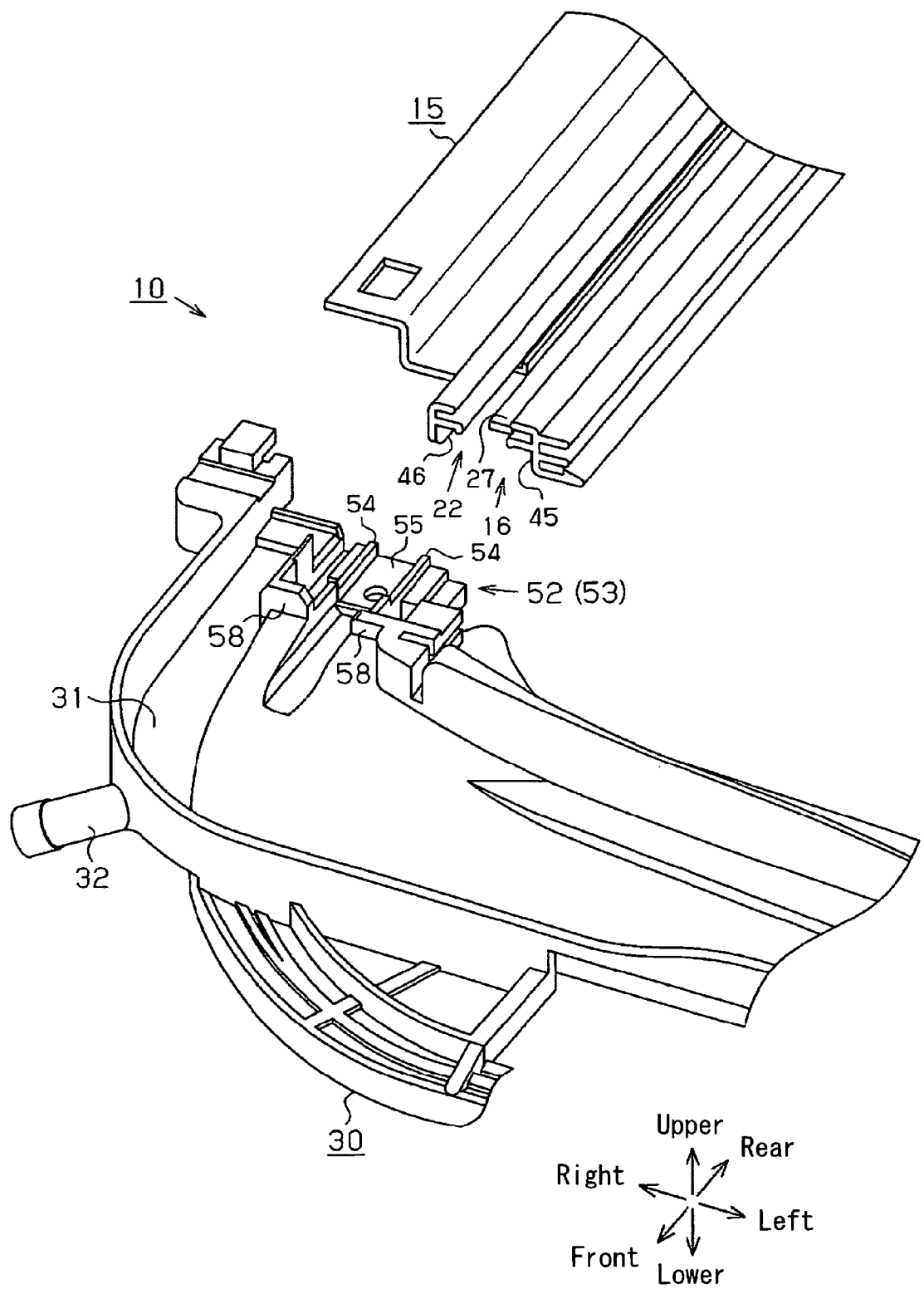
FIG. 7 is a schematic partial view illustrating a right side portion of a front housing and a front end portion of a right side guide rail of the roof apparatus according to the first embodiment.

Representation of the link members 5, 6 is omitted in FIGS. 4 to 6 and FIGS. 14 to 16. The front housing 30 is formed by means of molding a synthetic resin material. As shown in FIG. 7, the left and right end portions of the front housing 30 in the width direction of the vehicle are connected to front end portions of the guide rails 14, 15 respectively. As shown in at least one of FIGS. 1 to 3, a gutter portion 31 for receiving, for example, rain water entering an inside of the roof apparatus 10 through a front portion of the opening portion 12 is formed at an upper portion of the front housing 30 so as to be integral with the front housing 30 and to extend in the width direction of the vehicle. A drain pipe 32 is connected to each of the left and right portions of the gutter portion 31 in the width direction of the vehicle so that, for example, the rain water that drops into the gutter portion 31 is discharged outside the roof apparatus 10 through the drain pipes 32, 32.

Figure 8:
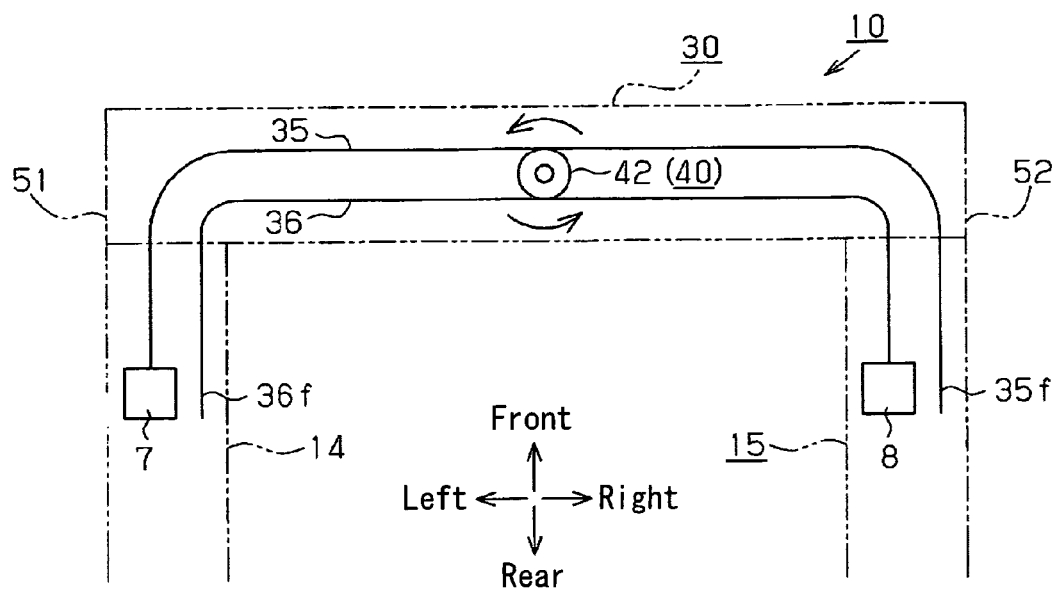
FIG. 8 is a schematic plane view illustrating an arrangement of a pair of outer spur tooth rack belt and an inner spur tooth rack belt in the front housing, in the right side guide rail and in a left side guide rail of the roof apparatus according to the first, second, third and fourth embodiments.
Figure 12:
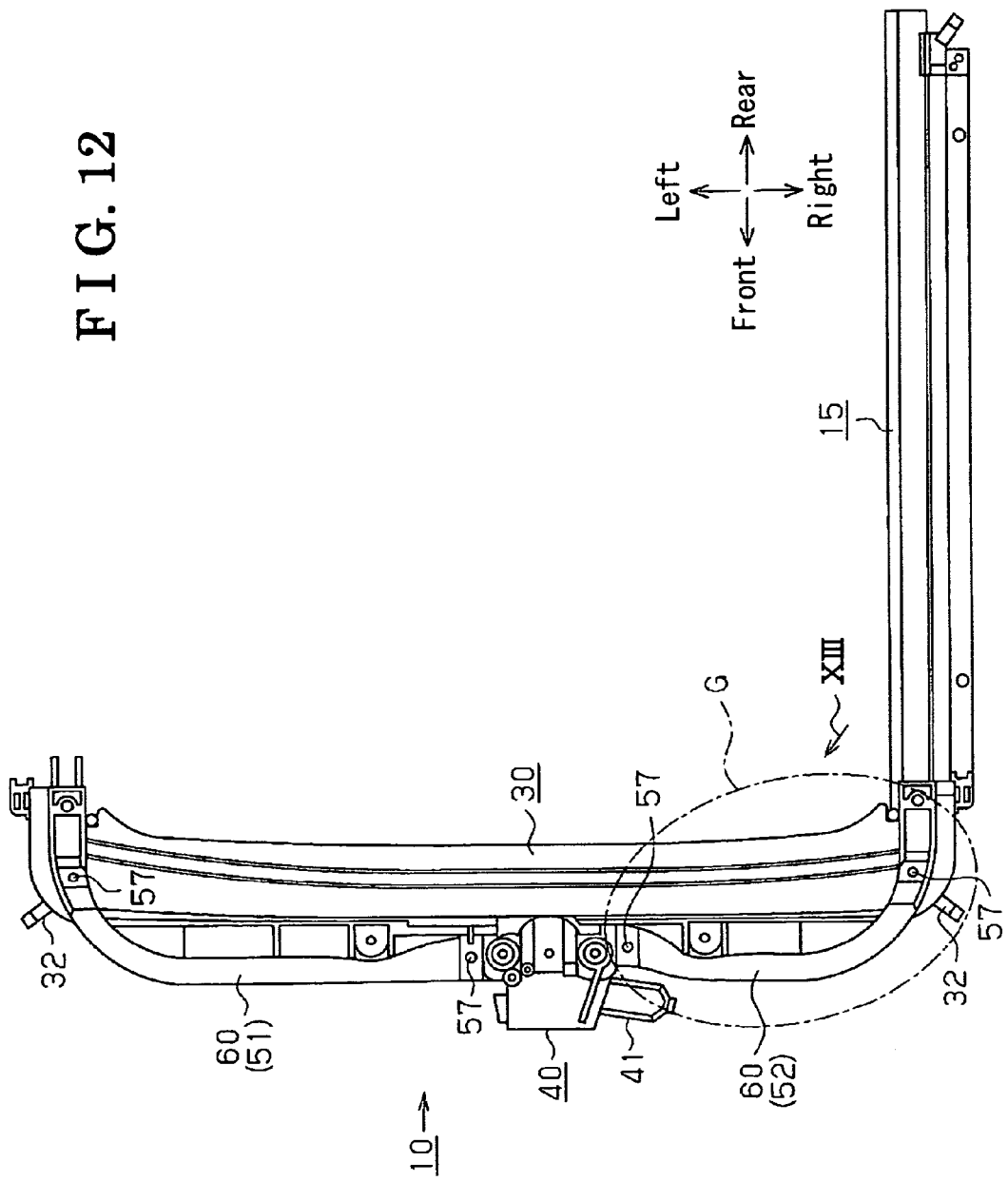
FIG. 12 is a schematic bottom view illustrating the roof apparatus for the vehicle according to the first, second, third and fourth embodiments in a state where the left side guide rail is not connected thereto.
Figure 13:
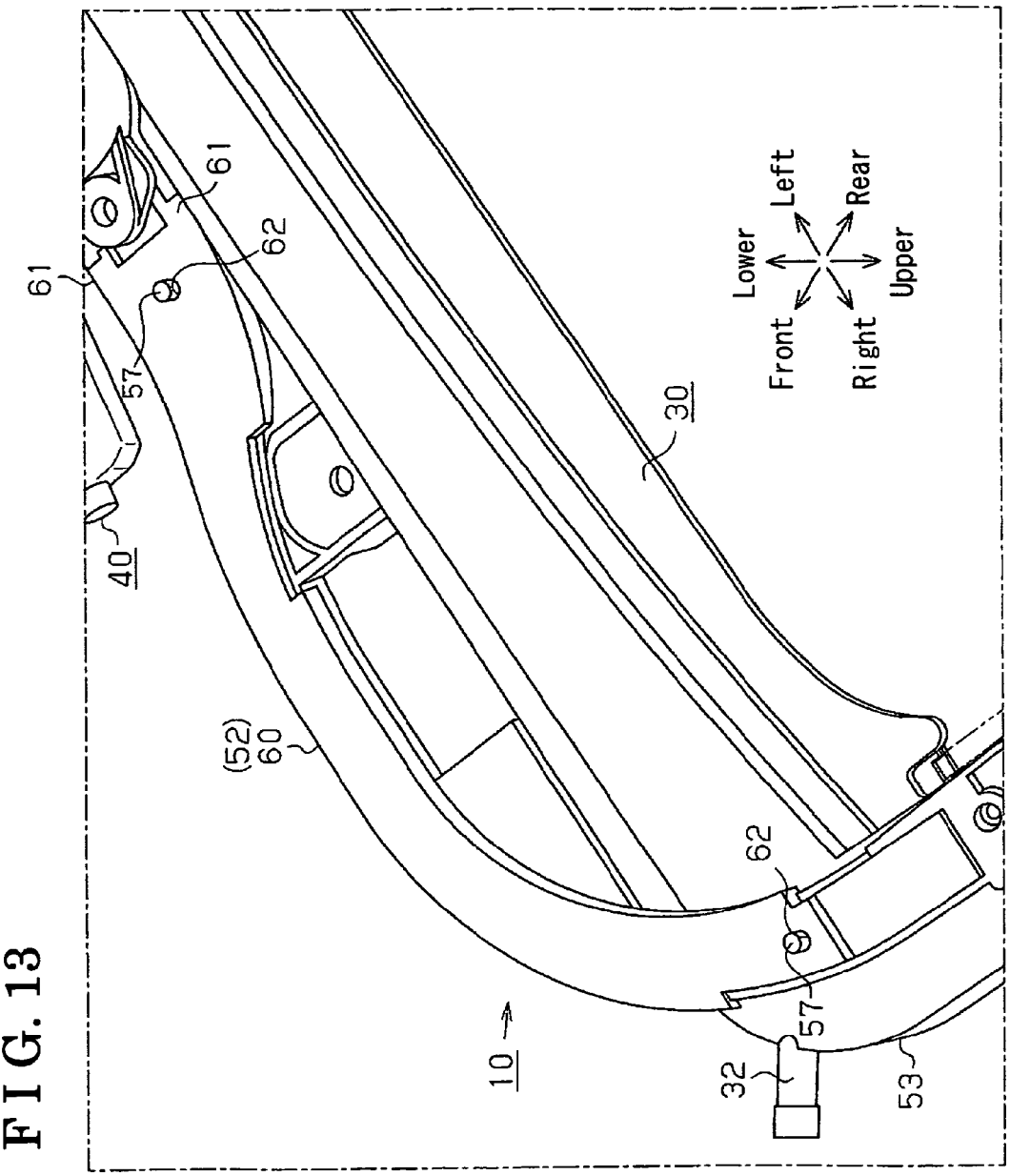
FIG. 13 is a partial perspective view illustrating a portion G of FIG. 12 when viewed from a direction of the arrow XIII of FIG. 12.
Figure 14:
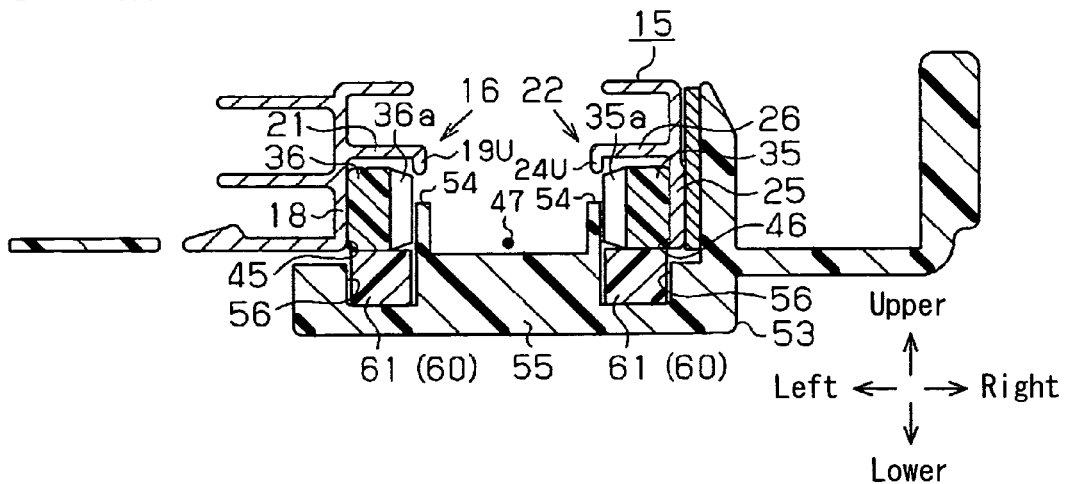
FIG. 14 is a cross-sectional view corresponding to FIG. 4, according to the second embodiment where an intermediate cutout portion is formed at a front end portion of a connecting bottom wall portion.

As shown in FIG. 12, part of the front housing 30 constitutes part of each of a pair of casings 51, 52 provided on the left and right sides of the vehicle, which will be explained in details below. As shown in FIG. 8, the outer spur tooth rack belt 35 and the inner spur tooth rack belt 36 are arranged substantially in parallel to each other in a longitudinal direction thereof in the casings 51, 52, the left side guide rail 14 and the right side guide rail 15. The outer spur tooth rack belt 35 extends in the width direction of the vehicle in the front housing 30 and extends in the front/rear direction of the vehicle in the guide rails 14, 15. The outer spur tooth rack belt 35 is arranged so as to curve at connecting portions between the left side and the right side portions of the front housing 30 (the casings 51, 52) and the guide rails 14, 15 respectively. The inner spur rack belt 36 is positioned rearward of the outer spur tooth rack belt 35 in the front/rear direction of the vehicle in the front housing 30, and is positioned inward of the outer spur tooth rack belt 35 in the width direction of the vehicle in the guide rails 14, 15, that is, closer to the lateral center of the vehicle. Due to the above-explained positional relationship, the outer spur tooth rack belt 35 and the inner spur tooth rack belt 36 do not intersect with each other at any point when viewed in a plane view. The outer spur tooth rack belt 35 and the inner spur tooth rack belt 36, however, may intersect with each other when viewed in the plane view.

Figure 9:
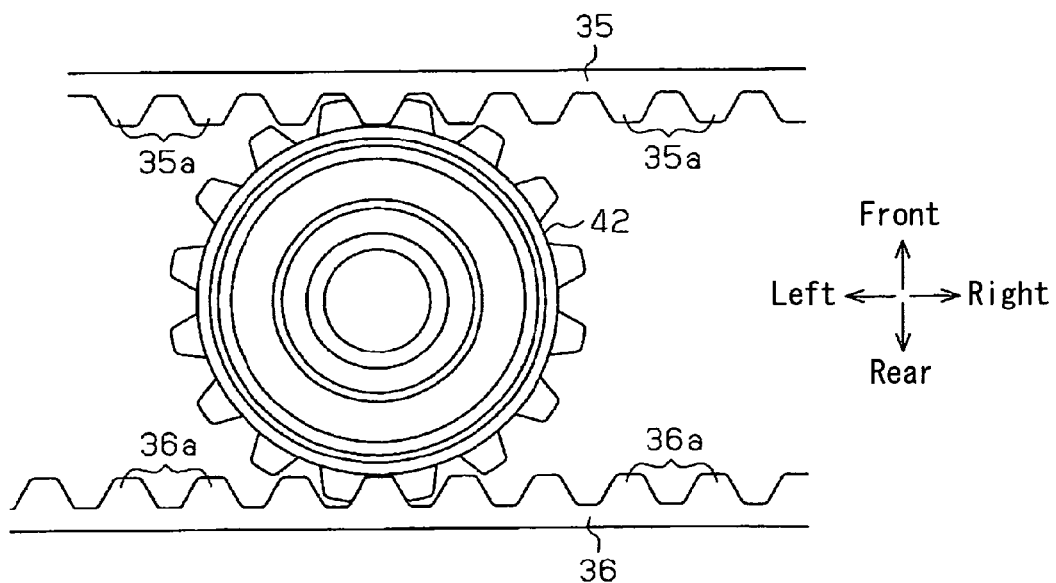
FIG. 9 is a partial plan view illustrating the outer and inner spur tooth rack belts, and a spur gear engaging with the outer and inner spur tooth rack belts of the roof apparatus according to the first, second, third and fourth embodiments.

As shown in FIG. 9, the outer spur tooth rack belt 35 includes plural spur teeth 35a (i.e., plural first spur teeth) formed on a surface facing the inner spur tooth rack belt 36 so that each of the spur teeth 35a protrudes in a direction perpendicular to the longitudinal direction of the outer spur tooth rack belt 35, that is, in the vertical direction of the vehicle. In a similar manner, the inner spur tooth rack belt 36 includes plural spur teeth 36a (i.e., plural second spur teeth) formed on a surface facing the outer spur tooth rack belt 35 so that each of the spur teeth 36a protrudes in a direction perpendicular to the longitudinal direction of the outer spur tooth rack belt 36, that is, in the vertical direction of the vehicle. The outer spur tooth rack belt 35 and the inner spur tooth rack belt 36 transmit a drive force of the drive mechanism 40 to the movable panel 13.

Figure 4:
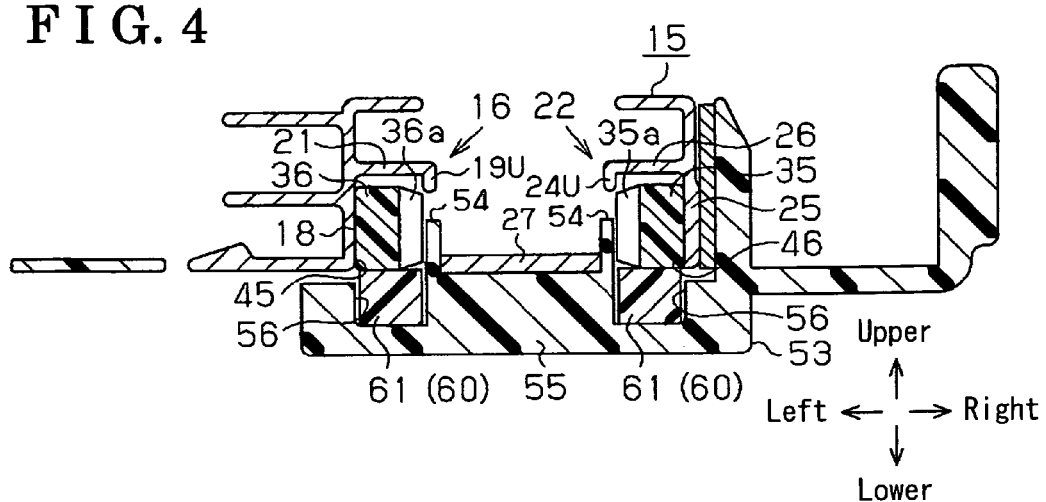
FIG. 4 is a cross-sectional view taken on line IV-IV of FIG. 1.
Figure 5:
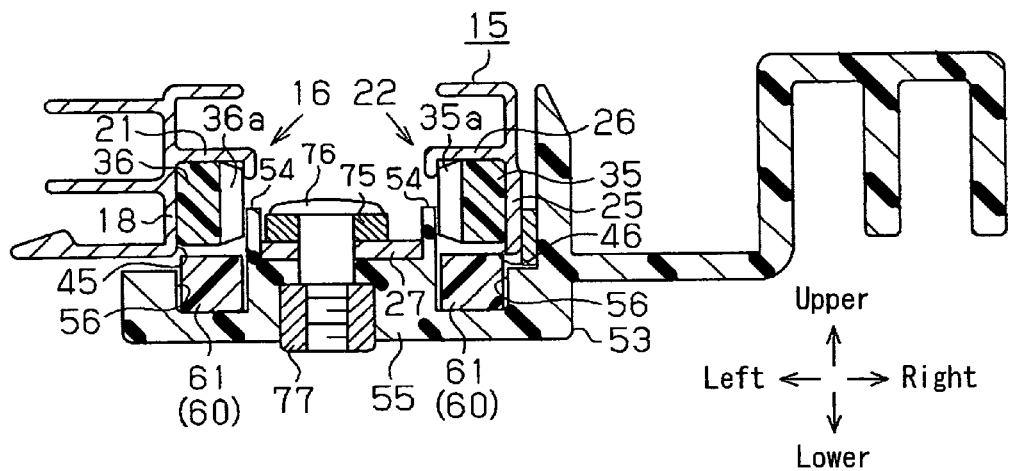
FIG. 5 is a cross-sectional view taken on line V-V of FIG. 1.

The outer spur tooth rack belt 35 and the inner spur tooth rack belt 36 are formed of a synthetic resin material so as to be flexible. In addition, as shown in FIGS. 4 and 5, each of the outer spur tooth rack belt 35 and the inner spur tooth rack belt 36 of this embodiment has a substantially rectangular cross section.

As shown in at least one of FIGS. 1 to 9 and 12, a drive mechanism 40 for driving the outer spur tooth rack belt 35 and the inner spur tooth rack belt 36 is supported by the front housing 30 so as to be positioned in a substantially central portion thereof in the width direction of the vehicle. The drive mechanism 40 is configured by, for example, an electric motor 41 fixedly mounted on the front housing 30 and by a spur gear 42 driven by the electric motor 41 to rotate. The spur gear 42 is disposed between the outer spur tooth rack belt 35 and the inner spur tooth rack belt 36 and engages with the spur teeth 35a and 36a. A reversible motor is used as the spur gear 42.

As shown in FIG. 8, in the left side guide rail 14, the left side shoe member 7 is connected to one of the end portions of the outer spur tooth rack belt 35, that is, the end portion located on the left side relative to the spur gear 42 in the width direction of the vehicle. The other one of the end portions of the outer spur tooth rack belt 35, that is, the end portion located on the right side relative to the spur gear 42 refers to a free end portion 35f to which no shoe member is connected.

In the right side guide rail 15, the right side shoe member 8 is connected to one of the end portions of the inner spur tooth rack belt 36, that is, the end portion located on the right side relative to the spur gear 42 in the width direction of the vehicle. The other one of the end portions of the inner spur tooth rack belt 36, that is, the end portion located on the left side relative to the spur gear 42 refers to a free end portion 36f to which no shoe member is connected.

Consequently, in the right side guide rail 15, the shoe member 8 connected to the inner spur tooth rack belt 36 is positioned on the left side and the free end portion 35f of the outer spur tooth rack belt 35 is positioned on the right side relative to each other in the width direction of the vehicle. In the left side guide rail 14, the shoe member 7 connected to the outer spur tooth rack belt 35 is positioned on the left side and the free end portion 36f of the inner spur tooth rack belt 36 is positioned on the right side relative to each other in the width direction of the vehicle. Thus, the shoe members 7, 8 and the free end portions 35f, 36f are arranged in a similar manner in the left side guide rail 14 and in the right side guide rail 15 to each other, more specifically, the shoe members 7, 8 are positioned on the left side and the free end portions 35f, 36f are positioned on the right relative to each other in the width direction of the vehicle.

Thus, the roof apparatus 10 for the vehicle includes the basic structure as explained above. Next, characteristic aspects of this embodiment will be explained below. In this embodiment, a connecting structure between the left side and the right side casings 51, 52 and the left side and the right side guide rails 14, 15 are characteristic.

The connecting structure between the left side casing 51 and the left side guide rail 14, and the connecting structure between the right side casing 52 and the right side guide rail 15 are identical except that the arrangements of the connecting structures are symmetrical to each other in the width direction of the vehicle. Therefore, the connecting structure between the right side casing 52 and the right side guide rail 15 will be explained and the explanation on the connecting structure between the left side casing 51 and the left side guide rail 14 will be omitted.

As shown in at least one of FIGS. 4 to 6, a cutout portion 45 is formed at the front end portion of the right side guide rail 15 by cutting out, in the front/rear direction of the vehicle, the bottom wall portion 17 and the lower restricting wall portion 19L, both of which configure the left side guide portion 16. In addition, a cutout portion 46 is formed at the front end portion of the right side guide rail 15 by cutting out the bottom wall portion 23 and the lower restricting wall portion 24L, both of which configure the right side guide portion 22.

On the other hand, as shown in at least one of FIGS. 2, 4 and 5, the casing 52 is constituted by a casing body 53 and a casing cover 60. A bottom portion of a large part of the casing body 53 downwardly opens and the opening is covered and closed by the casing cover 60 from below. Part of the front housing 30 constitutes the casing body 53. Partition walls 54, 54 are formed on at least one of the casing body 53 and the casing cover 60. The partition walls 54, 54 partition a space formed by the casing body 53 and the casing cover 60 into passages in which the outer spur tooth rack belt 35 and the inner spur tooth rack belt 36 are guided to slide respectively while keeping a distance therebetween.

A rear portion of the casing body 53 is inclined upward toward the rear side of the vehicle, thereby constituting an upper portion 70U of a slope portion 70. The casing cover 60 does not constitute any part of the upper portion 70U.

In this embodiment, the casing cover 60 is formed by means of molding the synthetic resin material of the same type as the material that forms the front housing 30. A rear portion of the casing cover 60 is inclined upward toward the rear side of the vehicle at a substantially similar gradient to that of the inclination of the casing body 53. The case cover 60 constitutes a large portion of a lower portion 70L of the slope portion 70. A portion of the casing body 53 is positioned forward of the bottom wall portions 17, 23 of the guide portion 16, 22 in the front/rear direction of the vehicle and, at the same time below the connecting bottom wall portion 27 in the vertical direction of the vehicle. The above-stated portion of the casing body 53 is also inclined toward the rear side of the vehicle and constitutes a slope configuring portion 55 configuring part of the lower portion 70L of the slope portion 70. A rear end portion of the casing cover 60 and the slope configuring portion 55 fill in the cutout portions 45, 46. The slope configuring portion 55 is fastened to the connecting bottom wall portion 27 together with a guide block 75, which guides a movement of the link member 6, by means of a bolt 76 and a nut 77.

At the slope configuring portion 55, the partition walls 54, 54 are formed at left and right end portions of the slope configuring portion 55 in the width direction of the vehicle, that is, the portions facing the upper restricting wall portions 19U, 24U of the guide rails 15 respectively, in a manner that a portion of each of the partition walls 54, 54 upwardly protrudes in the vertical direction of the vehicle. The partition walls 54, 54 perform a function similar to that of the lower restricting wall portions 19L, 24L. The partition walls 54, 54 are also gradually inclined upward toward the rear side of the vehicle. Rear end portions of the partition walls 54, 54 are connected to the front end portions of the lower restricting wall portions 19L, 24L of the guide rail 15 respectively. An interior space (i.e., the passages) of each of the slope portions 70, 70 communicates with an interior space of the left side and the right side guide portions 16, 22 via the cutout portions 45, 46.

A recess portion 56 which constitutes part of the casing body 53 and is positioned lower than the other portion of the slope configuring portion 55 is provided under the cutout portion 45, 46 in the vertical direction of the vehicle so as to be positioned forward of the slope configuring portion 55 in the front/rear direction of the vehicle. A recess portion (not shown) similar to the recess portion 56 is provided on the casing body 53 at an end portion thereof (refer to FIG. 13)

closer to the drive mechanism 40. On each of the casing bodies 53, 53 provided at left and right sides of the vehicle, a boss 57 is formed at plural points so as to downwardly protrude.

On the other hand, each of the left side and the right side casing covers 60, 60 is formed into a curved flat plate. As shown at least one of FIGS. 4 and 13, a locking protrusion 61 (i.e., the rear end portion) provided at each end portion of the left side and the right side casing covers 60, 60. The locking protrusion 61 is inserted into the recess portion 56 of the slope configuring portion 55 so as to engage therewith and is stopped by the recess portion 56. An upper surface of the locking protrusion 61 is inclined upward toward the rear side of the vehicle. On each of the casing covers 60, 60 provided at the left and right sides of the vehicle, a hole 62 is formed at plural points corresponding to the plural points at which the boss 57 is formed so as to receive therein the corresponding boss 57.

The casing cover 60 is fastened to the casing body 53 in the above-explained manner, and thus the passages in which the outer spur tooth rack belt 35 and the inner spur tooth rack belt 36 slide are formed. In addition, the slope portion 70 is provided forward of each of the guide rails 14, 15 so as to be inclined upward toward the rear side.

Figure 10:
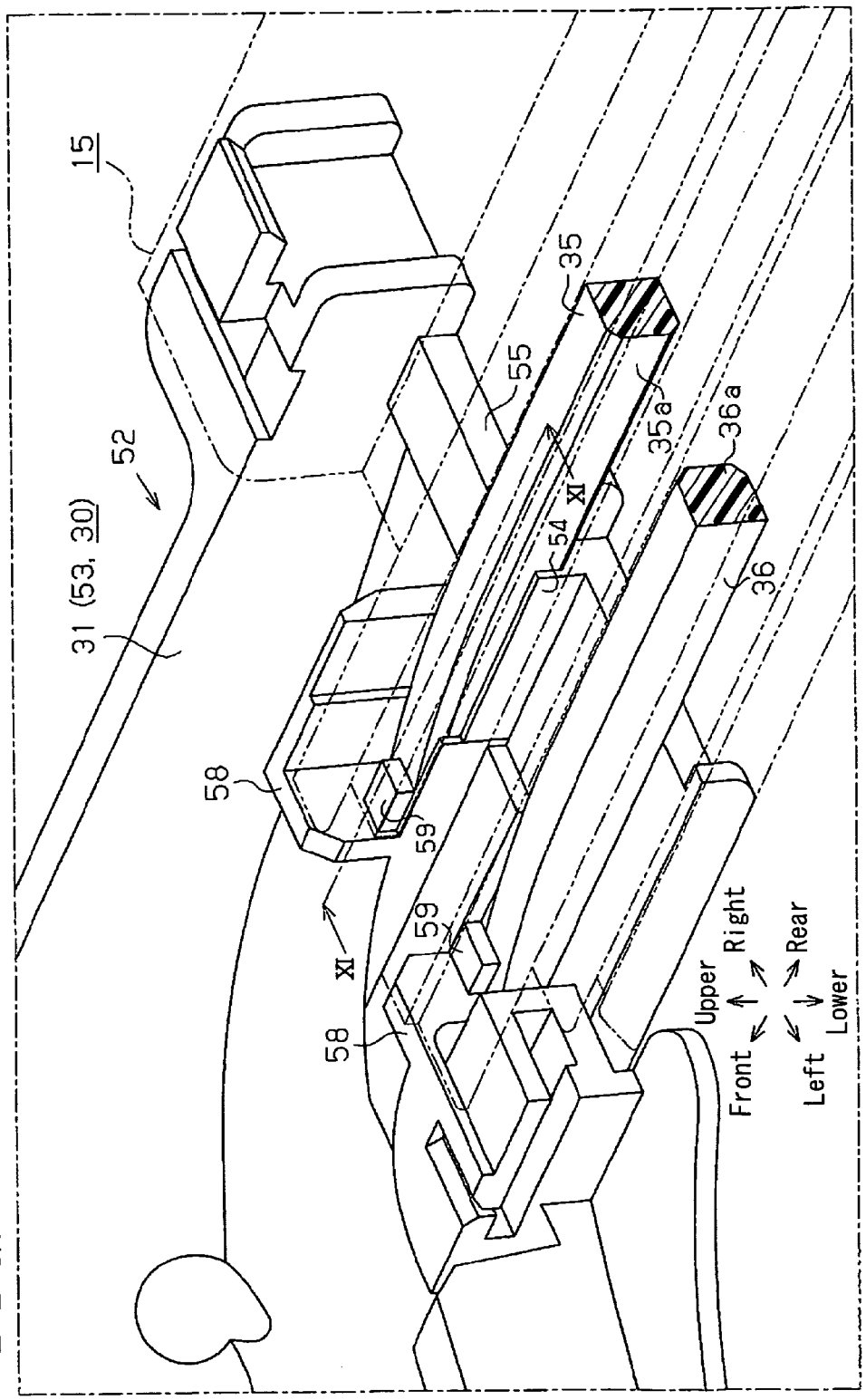
FIG. 10 is a perspective view illustrating a positional relationship between a connecting portion at which a casing is connected to the right side guide rail, and the outer and inner spur tooth rack belts of the roof apparatus according to the first embodiment.
Figure 11:
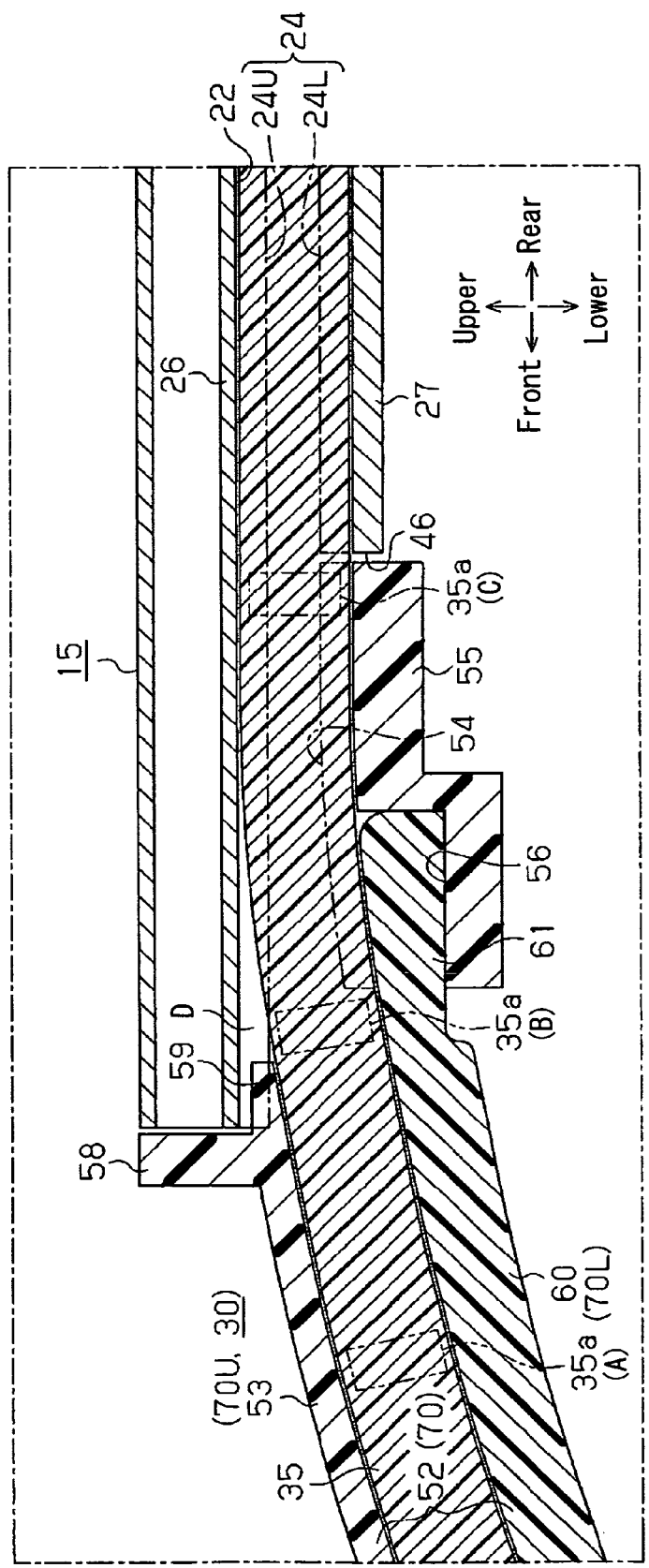
FIG. 11 is a cross-sectional view taken on line XI-XI of FIG. 10.

In addition, as shown in at least one of FIGS. 10 and 11, a pair of vertical walls 58, 58 is provide at the rear end portion of the casing body 53 so as to be positioned on the left side and the right side in the width direction of the vehicle while keeping a distance therebetween. In a state where the slope portion 70 is connected to the right side guide rail 15, the front portion of the guide rail 15 comes into contact with or comes close to the pair of vertical walls 58, 58. Lugs 59, 59 each formed into an elongated shape are provided at lower end portions of the vertical walls 58, 58 so as to protrude in the rear direction of the vehicle. A clearance D having a substantially triangle shape when viewed from the width direction of the vehicle is formed between an upper surface of each of the outer spur tooth rack belt 35 and the inner spur tooth rack belt 36 both of which are inclined along the slope portion 70, and each of the upper wall portions 21, 26 of the guide portion 16, 22.

Thus, the roof apparatus 10 for the vehicle of this embodiment includes the above-explained structure. The outer spur tooth rack belt 35 and the inner spur tooth rack belt 36 move in opposite directions with each other along the left side and the right side guide rails 14, 15, and along the passages formed by the casing body 53 and the casing cover 60 when the electric motor 41 of the drive mechanism 40 drives the spur gear 42 in the normal direction and the reverse direction. The outer spur tooth rack belt 35 and the inner spur tooth rack belt 36 move in the front/rear direction of the vehicle in the left side and the right side guide rails 14, 15. As the outer spur tooth rack belt 35 and the inner spur tooth rack belt 36 move in the front/rear direction of the vehicle, the shoe members 7, 8 are driven to move, and the movable panel 13 moves so as to open and close the opening portion 12.

For example, in case that the spur gear 42 is driven to rotate in the counterclockwise direction as indicated by the arrow in FIG. 8, the outer spur tooth rack belt 35 moves in the rear direction of the vehicle in the left side guide rail 14 and moves in the front direction of the vehicle in the right side guide rail 15. The inner spur tooth rack belt 36 moves in the rear direction of the vehicle in the right side guide rail 14.

As the outer spur tooth rack belt 35 moves in the rear direction of the vehicle in the left side guide rail 14, the shoe member 7 also moves in the rear direction. As the inner spur tooth rack belt 36 moves in the rear direction of the vehicle in the right side guide rail 15, the shoe member 8 also moves in the rear direction. As the shoe members 7, 8 move in the rear direction of the vehicle, the movable panel 13 moves in the rear direction, and thus the opening portion 12 is released.

In case that the spur gear 42 is driven to rotate in the clockwise direction in FIG. 8, the outer spur tooth rack belt 35 and the inner spur tooth rack belt 36 move in the directions reverse to the above-explained directions, and thus the movable panel 13 moves in the front direction of the vehicle so as to close the opening portion 12.

When the spur teeth 35a and the spur teeth 36a of the outer spur tooth rack belt 35 and the inner spur tooth rack belt 36 pass through the slope portions 70, 70 provided on the left side and the right side casings 51, 52 in the rear direction of the vehicle while causing the opening portion 12 to open, the spur tooth 35a and the spur tooth 36a of the outer spur tooth rack belt 35 and the inner spur tooth rack belt 36 are positioned perpendicular to a longitudinal direction of the slope portion 70 as shown in FIG. 11. In FIG. 11, only representative teeth from among the plural teeth 35a, 36a are indicated. Because the slope portion 70 is inclined upward toward the rear side of the vehicle, the teeth 35a, 36a are also inclined so that an upper portion of each of the spur teeth 35a, 36a is positioned forward and a lower portion thereof is positioned rearward in the front/rear direction of the vehicle as indicated by (A) in FIG. 11.

On the other hand, in a state where the slope portions 70, 70 of the left side and the right side casings 51, 52 are connected to the left side and the right side guide rails 14, 15 respectively, the partition walls 54, 54 of the left side and the right side casings 51, 52 are abutted and connected to a front end faces of each of the restricting wall portions 19, 24. The front end faces of the restricting wall portions 19, 24 are perpendicular (in this case, vertical) to the passages in which the outer spur tooth rack belt 35 and the inner spur tooth rack belt 36 slide.

Consequently, when the spur teeth 35a, 36a of the outer spur tooth rack belt 35 and the inner spur tooth rack belt 36 move from the slope portions 70, 70 to the left and the right guide rails 14, 15, the spur teeth 35a, 36a are guided by the slope portion 70 to move diagonally upwardly from a position, which is in the casing 51, 52 and lower than the left side and the right side guide rails 14, 15 in the vertical direction of the vehicle. At this time, the spur teeth 35a, 36a are inclined in a manner that the upper portions of the spur teeth 35a, 36a are positioned forward and the lower portions thereof are positioned rearward in the front/rear direction of the vehicle.

Thus, the spur teeth 35a, 36a pass through the cutout portions 45, 46 formed on the front end portion of the left and the right guide rails 14, 15 while maintaining the tilted state. At this time, in the left side and the right side guide rails 14, 15 the spur tooth 35a and the spur tooth 36a come into contact with the restricting wall portions 19, 24 which are formed at the left and right side portions of the bottom wall portion 17 respectively, while maintaining the tilted state as indicated by (B) in FIG. 11. More specifically, the spur tooth 35a and the spur tooth 36a first come into contact with the upper restricting wall portions 19U, 24U respectively while maintaining the tilted state.

Therefore, unlike in the state where the spur teeth 35a, 36a of the outer spur tooth rack belt 35 and the inner spur tooth rack belt 36 are parallel to the front end surfaces of the left and the right guide rails 14, 15 (i.e., the known sunroof apparatus), each of the spur teeth 36a of the inner spur tooth rack belt 36 does not come into contact with an edge portion, that is, a lower edge portion, of the front end face of the upper restricting wall portions 19U and with an edge portion, that is, an upper end portion, of the front end face of the lower restricting wall portions 19L at the same time. As a result, an abnormal noise (a tooth contact noise) caused by the spur teeth 36a coming into contact with the edge portion of the front end face of the upper restricting wall portion 19U and the edge portion of the front end face of the lower restricting wall portions 19L at the same time, may be controlled. In a same manner, the spur teeth 35a of the outer spur tooth rack belt 35 does not come into contact with an edge portion, that is, a lower edge portion, of the front end face of the upper restricting wall portions 24U and with an edge portion, that is, an upper edge portion, of the front end face of the lower restricting wall portions 24L at the same time. As a result, the tooth contact noise caused by the spur tooth 35a coming into contact with the edge portion of the front end face of the upper restricting wall portion 24U and the edge portion of the front end face of the lower restricting wall portions 24L at the same time, may be controlled.

As shown in at least one of the FIGS. 4 to 6 and 11, after passing through the position indicated by (B) in the FIG. 11, the spur teeth 35a, 36a pass through the slope configuring portion 55 of the casing 53 positioned forward of the bottom wall portions 17, 23 of the guide portion 16, 22 in the front/rear direction of the vehicle. The slope configuring portion 55 functions as part of the lower portion 70L of the slope portion 70. Thus, the spur teeth 35a, 36a of the outer spur tooth rack belt 35 and the inner spur tooth rack belt 36 pass through the slope configuring portion 55 in the tilted state when moving from the slope portion 70 to the guide rails 14, 15. However, a degree of inclination of the spur teeth 35a, 36a becomes gradually smaller as the spur teeth 35a, 36a move in the rear direction of the vehicle, that is, the spur teeth 35a, 36a gradually become vertically positioned.

The spur tooth 35a as a whole and the spurt tooth 36a as a whole enter the guide portions 16, 22 after passing through the cutout portions 45, 46 respectively. At this time, as indicated by (C) in FIG. 11, the spur teeth 35a, 36a come into contact with the front end faces of the lower restricting portions 19L, 24L of the guide rail 14, 15. However, the generation of the abnormal noise (the tooth contact noise) may be controlled because the upper portions of the spur teeth 35a, 36a are supported by the upper restricting wall portions 19U, 24U respectively.

The outer spur tooth rack belt 35 and the inner spur tooth rack belt 36, which entered the guide portions 16, 22 of the guide rails 14, 15 respectively, are guided by the bottom wall portions 17, 23 and by the restricting wall portions 18, 19, 24, 25 so as to move in the rear direction of the vehicle. At this time, the outer spur tooth rack belt 35 and the inner spur tooth rack belt 36 in the guide portions 16, 22 are supported from below by the bottom wall portions 17, 23 and restricted by the restricting wall portions 18, 19, 24, 25 from moving in the width direction of the vehicle.

As explained above, according to the roof apparatus 10 for the vehicle of this embodiment, the following effects and advantages may be achieved. The slope portion 70 which constitutes part of each of the casing 51, 52 and which is inclined upward toward the rear side of the vehicle is provided forward of each of the left side and the right side guide rails 14, 15 in the front/rear direction of the vehicle. The pair of guide portions 16, 22 is provided at each of the guide rails 14, 15 so as to be positioned on the left side and the right side in the width direction of the vehicle while keeping a distance therebetween for guiding the outer spur tooth rack belt 35 and the inner spur tooth rack belt 36 respectively in the front/rear direction of the vehicle. The left side guide portion 16 includes the bottom wall portions 17 and the restricting wall portion 18, 19 formed at the left side and the right side portions of the bottom wall portion 17 respectively in the width direction of the vehicle. The right side guide portion 22 includes the bottom wall portions 23 and the restricting wall portions 24, 25 formed at the left side and the right side portions of the bottom wall portion 23 respectively in the width direction of the vehicle. The cutout portions 45, 46 are formed at the front end portion of each of the guide rails 14, 15 by cutting out the bottom wall portions 17, 23 of the guide portions 16, 22. The slope portions 70, 70 communicate with the guide portion 16, 22 via the cutout portions 45, 46 respectively (refer to FIGS. 4 and 6).

Thus, the spur teeth 35a, 36a of the outer spur tooth rack belt 35 and the inner spur tooth rack belt 36 become inclined while passing through the slope portion 70. Then, the spur teeth 35a, 36a enter the inside of the guide rails portions 16, 22 via the cutout portions 45, 46 formed at the front end portions of the guide rails 14, 15 while maintaining the tilted state. When entering the inside of the guide rails portions 16, 22, the spur teeth 35a, 36a come into contact with the restricting wall portions 19, 24 of the guide portion 16, 22 of the guide rails 14, 15 in the tilted state.

As a result, even in case that the casings 51, 52 are connected to the guide rails 14, 15 in a misaligned manner relative to the guide rails 14, 15 in the width direction of the vehicle, and therefore inner wall surfaces of the slope portions 70, 70 and inner wall surfaces of the guide rails 14, 15 include a step formed therebetween, the generation of the tooth contact noise that attributes to that the spur teeth 35a, 36a come into contact with the edge portions of the front end faces of the upper restricting wall portions 19U, 24U and the edge portion of the front end faces of the lower restricting wall portions 19L, 24L at the same time may be controlled.

Thus, it is not necessary from a viewpoint of the tooth contact noise to connect the casings 51, 52 to the guide rails 14, 15 with a high precision so that no step is formed between the inner wall surfaces of the slope portions 70, 70 and the inner wall surfaces of the guide rails 14, 15.

Each of the casings 51, 52 is constituted by the casing body 53 whose bottom portion downwardly opens and the casing cover 60 closing the opening of the casing body 53 from below (refer to FIG. 2). Thus, the passages in which the outer spur tooth rack belt 35 and the inner spur tooth rack belt 36 are inserted are formed between the casing body 53 and the casing cover 60 in the vertical direction of the vehicle in a simple way. In addition, the slope portions 70, 70 are readily formed by the casing body 53 and the casing cover 60 so as to be positioned forward of the guide rails 14, 15 respectively in a manner that the slope portion 70 is inclined upward toward the rear side of the vehicle.

The slope configuring portion 55 configuring part of the lower portion 70L of the slope portion 70 is provided at the casing body 53 at a position forward of the bottom wall portions 17, 23 of the guide portion 16, 22. The recess portion 56 is provided at a position forward of the slope configuring portion 55. The locking protrusion 61 provided at the rear end portion of the casing cover 60 engages with and is stopped by the recess portion 56 (refer to FIGS. 2 and 4).

According to the roof apparatus 10 for the vehicle of this embodiment, each of the casings 51, 52 is constituted by the casing 53 and the casing cover 60, however, the casing cover 60 is assembled to the casing body 53 while being positioned relative to the casing body 53 by having the locking protrusion 61 engaged with and stopped by the recess 56 as explained above.

The lug 59 is provided at the lower end portion of each of the pair of vertical wall portions 58, 58 provided at the rear end of the casing bodies 53 so that the lug 59 protrudes in the rear direction of the vehicle. Each of the lugs 59, 59 is inserted into the clearance D having the substantially triangle shape when viewed from the width direction of the vehicle. The clearance D is formed between the outer and the inner spur tooth rack belts 35, 36 inclined by means of the slope portions 70, 70 and the upper wall portions 21, 26 of the guide portions 16, 22 (refer to FIGS. 10 and 11).

Thus, the lugs 59, 59 restrict the slope portions 70, 70 (the casing bodies 53, 53) from moving relative to the guide rails 14, 15 in the width direction of the vehicle. In addition, in the slope portions 70, 70, the outer and the inner spur tooth rack belts 35, 36 are restricted by the lugs 59, 59 from moving, that is, flapping in the upper direction of the vehicle.

Each of the guide rails 14, 15 is provided with the pair of guide portion 16, 22. In one of the guide portions 16 and 22 provided at the left side guide rail 14, the end portion of, for example, the outer spur tooth rack belt 35 to which the shoe member 7 is connected is guided. In the other one of the guide portions 16 and 22, the free end 36f of the inner spur tooth rack belt 36 is guided. In a similar manner to that explained above, in one of the guide portions 16 and 22 provided at the right side guide rail 15, the end portion of, for example, the inner spur tooth rack belt 36 to which the shoe member 8 is connected is guided. In the other one of the guide portions 16 and 22, the free end 35f of the outer spur tooth rack belt 35 is guided.

Consequently, the outer spur tooth rack belt 35 and the inner spur tooth rack belt 36 do not intersect with each other at any point when viewed in a plane view. In addition, one of the spur tooth rack belts 35 and 36 is set to be the outer spur tooth rack belt 35, and the other of the spur tooth belts 35 and 36 is set to be the inner spur tooth rack belt 36 that is positioned inward of the outer spur tooth rack belt 35 in the width direction of the vehicle and actuated to move.

Thus, the shoe members 7, 8 and the free end portions 35f, 36f are arranged in a similar manner in the left side guide rail 14 and in the right side guide rail 15 to each other, more specifically, the shoe members 7, 8 are positioned on the left side and the free end portions 35f, 36f are positioned on the right side relative to each other.

The casing cover 60 is made from the synthetic resin material of the same type as the material that forms the front housing 30. Thus, the casing cover 60 and the front housing 30 may be formed in one molding die at the same time, which may reduce a cost of the molding die and a processing cost.

Variations or changes may be made to the above-explained first embodiment as follows. Second, third and fourth embodiments of a roof apparatus related to this disclosure will be explained with reference to illustrations of FIGS. 14 to 16 of the attached drawings. At each of the front end portions of the guide rails 14, 15, the connecting bottom wall portion 27 is not directly involved in the movement of the outer spur tooth rack belt 35 and the inner spur tooth rack belt 36 in the front/rear direction of the vehicle. Therefore, at the front end portion of each of the guide rails 14, 15, an intermediate cutout portion 47 may be formed at the connecting bottom wall portion 27 by cutting out, in the front/rear direction of the vehicle, the connecting bottom wall portion 27 (the second embodiment).

In order to form the intermediate cutout portion 47 at the connecting bottom wall portion 27 in addition to the cutout portions 45, 46, the entire bottom portion of the front end portion of the each of the guide rails 14, 15 needs to be cut out. In this case, a process for forming the cutout portions is easier compared to the case where only the cutout portions 45, 46 are formed by cutting out the front end portion of the bottom portion of the bottom wall portions 17, 23.

Further, in case that the cutout portions 45, 46 and the intermediate cutout portion 47 are formed, the configuration of the slope portion 70 of each of the casings 51, 52 may be simplified compared to the case where only the cutout portions 45, 46 are formed by cutting out the front end portions of the bottom wall portions 17, 23.

Figure 15:
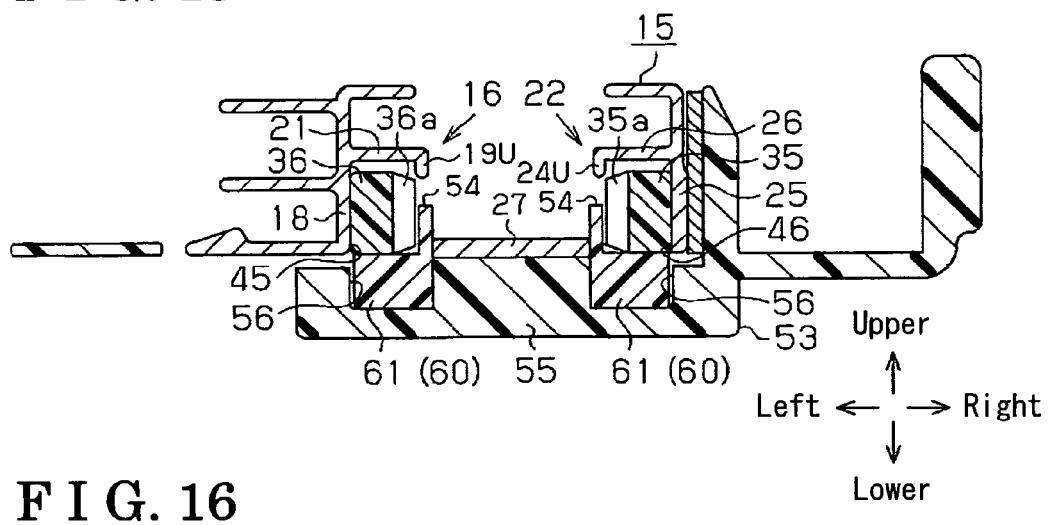
FIG. 15 is a cross-sectional view corresponding to FIG. 4, according to the third embodiment of this disclosure where a partition wall is formed on a casing cover.
Figure 16:
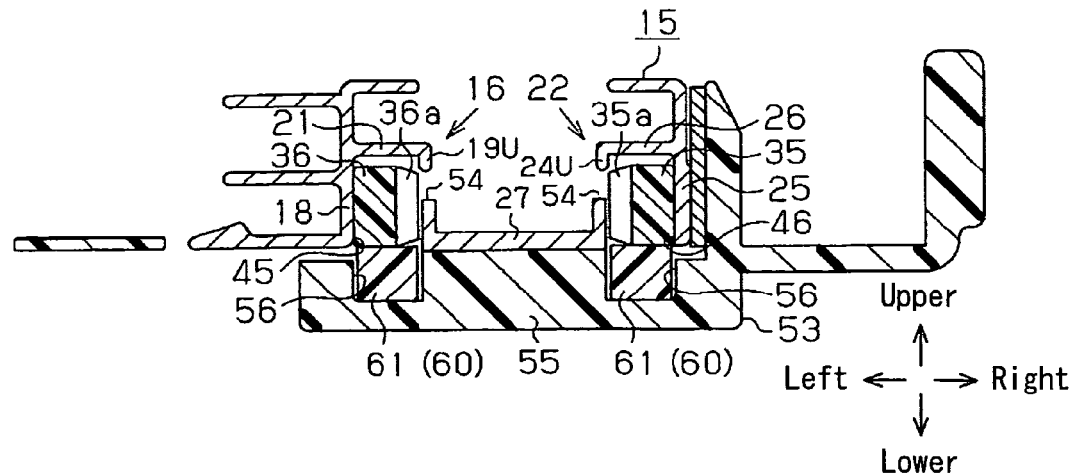
FIG. 16 is a cross-sectional view corresponding to FIG. 4, according to the fourth embodiment of this disclosure where a partition wall is formed on a guide rail.

In the first embodiment, the partition wall 54 is formed on the slope configuring portion 55 of each of the casing bodies 53, 53 (refer to FIGS. 4 and 5). The partition wall 54 may be, however, provided on each of the casing covers 60, 60 as shown in FIG. 15 (the third embodiment). Alternatively, the partition walls 54, 54 may be formed on the connecting bottom wall portion 27 at end portions thereof in the width direction of the vehicle while keeping a distance between the partition walls 54, 54 in the width direction of the vehicle (the fourth embodiment).

The restricting wall portions 19, 24, which are positioned closer to the connecting bottom wall portion 27 than the restricting wall portions 18, 25 are positioned, is separated into the two portions in an area where the shoe members 7, 8 move in the front/rear direction of the vehicle. In this area, the communication needs to be established between the inside and the outside of each of the guide portions 16, 22 so that the outer spur tooth rack belt 35 and the inner spur tooth rack belt 36 accommodated in the guide portions 16, 22 respectively are connected to the shoe members 7, 8 positioned outside the guide portions 16, 22 respectively.

On the other hand, the slope portion 70 is positioned to be away toward the front direction of the vehicle from the ranges of movement of the shoe members 7, 8. Thus, at the slope portion 70, the upper restricting wall portion 19U and the lower restricting wall portion 19L may be connected with each other so as to form one restricting wall, and the upper restricting wall portion 24U and the lower restricting wall portion 24L may be connected with each other so as to form one restricting wall.

The casing cover 60 may be made from a synthetic resin material which is different from that forms the casing body 53 (the front housing 30) or may be made from other material than the synthetic resin, including but not limited to a metal.

In the first embodiment, the slope configuring portion 55 is formed to be part of the casing body 53 (front housing 30), however, the slope configuring portion 55 may be integrally formed to be part of casing cover 60.

The entire casing 51 and the entire casing 52 may be constituted by the front housing 30. Further, the first, second, third and fourth embodiments are adapted to be used in the roof apparatus 10 for the vehicle, where the gutter portion 31 is formed separately from the housing 30.

According to the embodiments, the roof apparatus 10 for the vehicle includes the pair of guide rails 14, 15 extending in the front/rear direction of the vehicle along the side end portions of the opening portion 12 formed on the roof 11 of the vehicle 4, the movable panel 13 supported by the pair of guide rails 14, 15 and opening and closing the opening portion 12 by moving in the front/rear direction of the vehicle, the front housing 30 extending in the width direction of the vehicle along the front end portion of the opening portion 12, being connected to the front end portion of each of the pair of guide rails 14, 15 and supporting the drive mechanism 40, the casing 51, 52 at least part of which is constituted by the front housing 30, the outer spur tooth rack belt 35 and the inner spur tooth rack belt 36 both of which are accommodated in the pair of guide rails 14, 15 and in the casing 51, 52 in a manner that the outer spur tooth rack belt 35 and the inner spur tooth rack belt 36 slide along the pair of guide rails 14, 15 and along the casing 51, 52 for transmitting the drive force of the drive mechanism 40 to the movable panel 13. The outer spur tooth rack belt 35 includes the plural spur teeth 35a formed on the surface of the outer spur tooth rack belt 35 which faces the surface of the inner spur tooth rack belt 36 on which the plural spur teeth 36a are formed in a manner that the plural spur teeth 35a and the plural spur teeth 36a protrude in the direction perpendicular to the lengthwise direction of the outer spur tooth rack belt 35 and the inner spur tooth rack belt 36, the slope portion 70 constituting part of the casing 51, 52 and being inclined upward toward the rear side of the vehicle is provided forward of each of the pair of guide rails 14, 15 relative to the front/rear direction of the vehicle, the pair of guide portions 16, 22 is provided at each of the guide rails 14, 15, the guide portions 16, 22 positioned keeping the distance from each other in the width direction of the vehicle for guiding the outer spur tooth rack belt 35 and the inner spur tooth rack belt 36 respectively in the front/rear direction of the vehicle, each of the pair of guide portions 16, 22 includes the bottom wall portion 17, 23 and the pair of restricting wall portions 18, 19, 24, 25 positioned at the side portions of the bottom wall portion 17, 23 relative to the width direction of the vehicle, and the front end portion of each of the pair of guide rails 14, 15 includes the cutout portion 45, 46 formed by cutting out the bottom wall portion 17, 23, and the slope portion 70 and each of the pair of guide portions 16, 22 are connected with each other in a manner that the slope portion 70 communicates with each of the pair of guide portions 16, 22 via the cutout portion 45, 46.

According to the above-described structure, when the spur teeth 35a, 36a of the outer spur tooth rack belt 35 and the inner spur tooth rack belt 36 move from the slope portions 70, 70 to the left and the right guide rails 14, 15, the spur teeth 35a, 36a are guided by the slope portion 70 to move gradually diagonally upward from the position, which is in the casing 51, 52 and lower than the left side and the right side guide rails 14, 15 in the vertical direction of the vehicle. At this time, the spur teeth 35a, 36a are inclined in a manner that the upper portions of the spur teeth 35a, 36a are positioned forward and the lower portions thereof are positioned rearward in the front/rear direction of the vehicle. Thus, the spur teeth 35a, 36a enter the inside of the guide rails portions 16, 22 via the cutout portions 45, 46 formed at the front end portions of the guide rails 14, 15 while maintaining the tilted state. When entering the inside of the guide rails portions 16, 22, the spur teeth 35a, 36a come into contact with the restricting wall portions 19, 24 of the guide portion 16, 22 of the guide rails 14, 15 in the tilted state, and thus the generation of the tooth contact noise is controlled.

According to the embodiments, each of the pair of guide rails 14, 15 includes the connecting bottom wall portion 27 provided between the pair of guide portions 16, 22 for connecting the bottom wall portions 17, 23 with each other and the front end portion of each of the pair of guide rails 14, 15 includes the intermediate cutout portion 47 formed by cutting out the connecting bottom wall portion 27.

According to the above-described structure, at each of the front end portions of the guide rails 14, 15, the connecting bottom wall portion 27 is not directly involved in the movements of the outer spur tooth rack belt 35 and the inner spur tooth rack belt 36 in the front/rear direction of the vehicle. Therefore, the intermediate cutout portion 47 may be formed at the connecting bottom wall portion 27 by cutting out, in the front/rear direction of the vehicle, the front end portion of the connecting bottom wall portion 27. In order to form the intermediate cutout portion 47 at the connecting bottom wall portion 27 in addition to the cutout portions 45, 46, the entire bottom portion of the front end portion of the each of the guide rails 14, 15 needs to be cut out. In this case, the process for forming the cutout portions is easier compared to the case where only the cutout portions 45, 46 are formed by cutting out the front end portions of the bottom wall portions 17, 23. Further, the configuration of the slope portion 70 of each of the casings 51, 52 may be simplified.

According to the embodiments, the casing 51, 52 includes the casing body 53 whose bottom portion downwardly opens and the casing cover 60 closing the casing body 53 from below, and the passages into which the outer spur tooth rack belt 35 and the inner spur tooth rack belt 36 are inserted are formed between the casing body 53 and the casing cover 60. The slope portion 70 includes the upper portion 70U and the lower portion 70L, and the upper portion 70L is constituted by part of the casing body 53 and at least part of the lower portion 70L is constituted by part of the casing cover 60.

According to the above-described structure, the casing 52 is constituted by the casing body 53 and the casing cover 60. Thus, the passages in which the outer spur tooth rack belt 35 and the inner spur tooth rack belt 36 are inserted, and the slope portion 70 are formed in a simple way.

According to the embodiments, the casing body 53 includes the slope configuring portion 55 provided forward of the bottom wall portions 17, 23 of the pair of guide portions 16, 22 relative to the front/rear direction of the vehicle and constituting part of the lower portion 70L of the slope portion 70, and the recessed portion 56 provided forward of the slope configuring portion 55 in the front/rear direction of the vehicle, and the locking protrusion 61 of the casing cover 60 engages with and is stopped by the recessed portion 56.

According to the above-described structure, the slope configuring portion 55, which is positioned forward of the bottom wall portions 17, 23 of the guide portion 16, 22 relative to the front/rear direction of the vehicle, functions as part of the lower portion 70L of the slope portion 70. Thus, the spur teeth 35a, 36a of the outer spur tooth rack belt 35 and the inner spur tooth rack belt 36 pass through the slope configuring portion 55 in the tilted state when moving from the slope portion 70 to the guide rails 14, 15.

According to the above-described structure, each of the casings 51, 52 is constituted by the casing 53 and the casing cover 60, however, the casing cover 60 is assembled to the casing body 53 while being positioned relative to the casing body 53 by having the locking protrusion 61 engaged with and stopped by the recess 56 as explained above.

According to the first embodiment, the slope configuring portion 55 includes the pair of partition walls 54, 54.

According to the above-described structure, the outer spur tooth rack belt 35 and the inner spur tooth rack belt 36 are restricted by the partition walls 54, 54 from moving in the width direction of the vehicle.

According to the embodiments, the roof apparatus 10 for the vehicle includes the pair of guide rails 14, 15 extending in the front/rear direction of the vehicle along the side end portions of the opening portion 12 formed on the roof 11 of the vehicle 4, the movable panel 13 supported by the pair of guide rails 14, 15 and opening and closing the opening portion 12 by moving in the front/rear direction of the vehicle, the front housing 30 extending in the width direction of the vehicle along the front end portion of the opening portion 12, being connected to the front end portion of each of the pair of guide rails 14, 15 and supporting the drive mechanism 40, the casing 51, 52 at least part of which is constituted by the front housing 30, the outer spur tooth rack belt 35 and the inner spur tooth rack belt 36 both of which are accommodated in each of the pair of guide rails 14, 15 and in the casing 51, 52 in a manner that the outer spur tooth rack belt 35 and the inner spur tooth rack belt 36 slide along the pair of guide rails 14, 15 and along the casing 51, 52 for transmitting the drive force of the drive mechanism 40 to the movable panel 13, the outer spur tooth rack belt 35 including the spur teeth 35a formed on the surface of the outer spur tooth rack belt 35 which faces the surface of the inner spur tooth rack belt 36 on which the spur teeth 36a are formed in a manner that the spur teeth 35a and the spur teeth 366 protrude in the direction perpendicular to the lengthwise direction of the outer spur tooth rack belt 35 and the inner spur tooth rack belt 36, the slope portion 70 provided forward of each of the pair of guide rails 14, 15 relative to the front/rear direction of the vehicle, the slope portion 70 constituting part of the casing 51, 52 and being inclined upward toward the rear side of the vehicle, the pair of guide portions 16, 22 provided at each of the guide rails 14, 15, the guide portions 16, 22 positioned keeping the distance from each other in the width direction of the vehicle for guiding the outer spur tooth rack belt 35 and the inner spur tooth rack belt 36 respectively in the front/rear direction of the vehicle, each of the pair of guide portions 16, 22 including the bottom wall portion 17, 23 and the pair of restricting wall portions 18, 19, 24, 25 positioned at the side portions of each of the bottom wall portion 17, 23 in the width direction of the vehicle, the cutout portion 45, 46 formed at the front end portion of each of the pair of guide rails 14, 15 by cutting out the bottom wall portion 17, 23, and the pair of partition walls 54, 54 formed at the slope configuring portion 55 provided forward of the bottom wall portions 17, 23 of the pair of guide portions 16, 22 in the front/rear direction of the vehicle, each of the pair of partition walls 54, 54 being inclined upward toward the rear side of the vehicle. The slope portion 70 and each of the pair of guide portions 16, 22 are connected with each other in a manner that the slope portion 70 communicates with each of the pair of guide portions 16, 22 via the cutout portion 45, 46.

According to the embodiments, the roof apparatus 10 for the vehicle, which controls the tooth contact noise generated when the spur teeth 35a and the spur teeth 36a of the outer spur tooth rack belt 35 and the inner spur tooth rack belt 36 pass through the connecting portion between the casing and each of the pair of guide rails.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A roof apparatus for a vehicle, comprising:
a pair of guide rails extending in a front/rear direction of the vehicle along side end portions of an opening portion formed on a roof of a vehicle;
a movable panel supported by the pair of guide rails and opening and closing the opening portion by moving in the front/rear direction of the vehicle;
a housing extending in a width direction of the vehicle along a front end portion of the opening portion, being connected to a front end portion of each of the pair of guide rails and supporting a drive mechanism;
a casing at least part of which is constituted by the housing;
a first spur tooth rack belt and a second spur tooth rack belt both of which are accommodated in the pair of guide rails and in the casing in a manner that the first spur tooth rack belt and the second spur tooth rack belt slide along the pair of guide rails and along the casing for transmitting a drive force of the drive mechanism to the movable panel; wherein
the first spur tooth rack belt includes a plurality of first spur teeth formed on a surface of the first spur tooth rack belt which faces a surface of the second spur tooth rack belt on which a plurality of second spur teeth are formed in a manner that the plurality of first spur teeth and the plurality of second spur teeth protrude in a direction perpendicular to a lengthwise direction of the first spur tooth rack belt and the second spur tooth rack belt;
a slope portion constituting part of the casing and being inclined upward toward a rear side of the vehicle is provided forward of each of the pair of guide rails relative to the front/rear direction of the vehicle;
a pair of guide portions is provided at each of the guide rails, the guide portions positioned keeping a distance from each other in the width direction of the vehicle for guiding the first spur tooth rack belt and the second spur tooth rack belt respectively in the front/rear direction of the vehicle;
each of the pair of guide portions includes a bottom wall portion and a pair of restricting wall portions positioned at side portions of the bottom wall portion relative to the width direction of the vehicle; and
a front end portion of each of the pair of guide rails includes a cutout portion formed by cutting out the bottom wall portion, and the slope portion and each of the pair of guide portions are connected with each other in a manner that the slope portion communicates with each of the pair of guide portions via the cutout portion.

2. The roof apparatus for the vehicle according to claim 1, wherein
each of the pair of guide rails includes a connecting bottom wall portion provided between the pair of guide portions for connecting the bottom wall portions with each other and
the front end portion of each of the pair of guide rails includes an intermediate cutout portion formed by cutting out the connecting bottom wall portion.

3. The roof apparatus for the vehicle according to claim 1, wherein
the casing includes a casing body whose bottom portion downwardly opens and a casing cover closing the casing body from below, and passages into which the first spur tooth rack belt and the second spur tooth rack belt are inserted are formed between the casing body and the casing cover, and
the slope portion includes an upper portion and a lower portion, and the upper portion is constituted by part of the casing body and at least part of the lower portion is constituted by part of the casing cover.

4. The roof apparatus for the vehicle according to claim 2, wherein
the casing includes a casing body whose bottom portion downwardly opens and a casing cover closing the casing body from below, and passages into which the first spur tooth rack belt and the second spur tooth rack belt are inserted are formed between the casing body and the casing cover, and
the slope portion includes an upper portion and a lower portion, and the upper portion is constituted by part of the casing body and at least part of the lower portion is constituted by part of the casing cover.

5. The roof apparatus for the vehicle according to claim 3, wherein
the casing body includes a slope configuring portion provided forward of the bottom wall portions of the pair of guide portions relative to the front/rear direction of the vehicle and constituting part of the lower portion of the slope portion, and a recessed portion provided forward of the slope configuring portion relative to the front/rear direction of the vehicle, and
a rear end portion of the casing cover engages with and is stopped by the recessed portion.

6. The roof apparatus for the vehicle according to claim 4, wherein
the casing body includes a slope configuring portion provided forward of the bottom wall portions of the pair of guide portions relative to the front/rear direction of the vehicle and constituting part of the lower portion of the slope portion, and a recessed portion provided forward of the slope configuring portion relative to the front/rear direction of the vehicle, and a rear end portion of the casing cover engages with and is stopped by the recessed portion.

7. The roof apparatus for the vehicle according to claim 5, wherein
the slope configuring portion includes a pair of partition walls.

8. The roof apparatus for the vehicle according to claim 6, wherein
the slope configuring portion includes a pair of partition walls.

9. A roof apparatus for a vehicle, comprising:
a pair of guide rails extending in a front/rear direction of the vehicle along side end portions of an opening portion formed on a roof of a vehicle;
a movable panel supported by the pair of guide rails and opening and closing the opening portion by moving in the front/rear direction of the vehicle;
a housing extending in a width direction of the vehicle along a front end portion of the opening portion, being connected to a front end portion of each of the pair of guide rails and supporting a drive mechanism;
a casing at least part of which is constituted by the housing;
a first spur tooth rack belt and a second spur tooth rack belt both of which are accommodated in each of the pair of guide rails and in the casing in a manner that the first spur tooth rack belt and the second spur tooth rack belt slide along the pair of guide rails and along the casing for transmitting a drive force of the drive mechanism to the movable panel, the first spur tooth rack belt including a plurality of first spur teeth formed on a surface of the first spur tooth rack belt which faces a surface of the second spur tooth rack belt on which a plurality of second spur teeth are formed in a manner that the plurality of first spur teeth and the plurality of second spur teeth protrude in a direction perpendicular to a lengthwise direction of the first spur tooth rack belt and the second spur tooth rack belt;
a slope portion provided forward of each of the pair of guide rails relative to the front/rear direction of the vehicle, the slope portion constituting part of the casing and being inclined upward toward a rear side of the vehicle;
a pair of guide portions provided at each of the guide rails, the guide portions positioned keeping a distance from each other in the width direction of the vehicle for guiding the first spur tooth rack belt and the second spur tooth rack belt respectively in the front/rear direction of the vehicle, each of the pair of guide portions including a bottom wall portion and a pair of restricting wall portions positioned at side portions of the bottom wall portion in the width direction of the vehicle;
a cutout portion formed at a front end portion of each of the pair of guide rails by cutting out the bottom wall portion; and
a pair of partition walls formed at a slope configuring portion provided forward of the bottom wall portion of each of the pair of guide portions relative to the front/rear direction of the vehicle, each of the pair of partition walls being inclined upward toward the rear side of the vehicle; wherein
the slope portion and each of the pair of guide portions are connected with each other in a manner that the slope portion communicates with each of the pair of guide portions via the cutout portion.

* * * * *